UNITED STATES PATENT OFFICE.

JOHN GAST, OF BROOKLYN, NEW YORK.

METHOD OF PRODUCING IMPRESSIONS IN LINE OR STIPPLE FROM PHOTOGRAPHIC NEGATIVES.

SPECIFICATION forming part of Letters Patent No. 344,648, dated June 29, 1886.

Application filed June 26, 1885. Serial No. 169,911. (No model.)

*To all whom it may concern:*

Be it known that I, JOHN GAST, of Brooklyn, in the county of Kings and State of New York, have invented certain new and useful Improvements in Methods of Producing Impressions in Line or Stipple from Photographic Negatives, of which the following is a specification.

The object of this invention is to produce, from a photograph taken from nature or artist's work, a print or engraving which shall present in line or stipple the body-shades or half-tones of the original, for the purpose of producing fine lithographic work or producing relief-plates for the printing-press.

The invention consists of a method of producing impressions in line or stipple from photographic negatives by first drawing on a lithographic stone or plate a negative stipple or tint; then printing upon a sensitized plate an impression in black ink from the negative line or stipple plate; next placing a negative of the object or drawing to be reproduced on the sensitized plate and allowing the light rays to act thereon, so as to produce a picture in line or stipple from which an impression can be taken in fatty ink and transferred to a lithographic stone, or a relief-plate for printing purposes produced therefrom.

In carrying out my invention an ordinary photographic negative of the object to be reproduced is made—as, for instance, of a portrait or other object in nature or artist's work. Negative lines or negative stipples—that is to say, white lines or dots on a black ground— are next produced on a lithographic stone or metal plate, preferably by the vulcanized rubber pads for stigmographs, for which Letters Patent have heretofore been granted to me, No. 242,627, dated June 7, 1881. A sensitized plate is next prepared by means of any sensitizing substance, such as gelatine or asphaltum. Upon the smooth surface of the sensitized plate is printed an "offset" or impression in black ink from the negative line or stipple plate. The negative is then placed on the sensitized and lined or stippled plate, said plate being then exposed to light. The actinic rays act upon the uncovered parts of the sensitized plate, and produce thereby a picture having the lights and shades of the original photograph, all represented in lines or stipple. After the sensitized plate has been exposed to light, it is washed off with benzine or other solvent, in order to remove the ink used in making the offset or impression of the negative lines or stipples, and prepared in any approved manner for receiving fatty ink, which is applied to the sensitized plate by a common lithographic or printer's roller, and then transferred to the stone, upon which a copy of the object or picture in stipples or lines is produced that forms the groundwork for further lithographic purposes. If it be desired to obtain relief-plates for use in the printing-press, an impression is made from the sensitized plate upon a zinc plate, which is then etched in the usual way; or an impression is made and a photo-engraving made therefrom by any one of the well-known methods.

Having thus described my invention, I claim as new and desire to secure by Letters Patent—

The method herein described of producing impressions in pure lines or stipples from photographic negatives, which consists, first, in preparing a negative line or stipple plate; secondly, printing an offset or impression from said plate on a sensitized plate; thirdly, allowing the light rays to pass through a photographic negative onto the sensitized plate; fourthly, washing off the offset or impression from the sensitized plate by a suitable solvent, and, lastly, preparing the plate thus obtained for receiving fatty inks, substantially as set forth.

In testimony that I claim the foregoing as my invention I have signed my name in presence of two subscribing witnesses.

JOHN GAST.

Witnesses:
PAUL GOEPEL,
CARL KARP.